US006970756B2

(12) United States Patent  (10) Patent No.: US 6,970,756 B2
Levionnois  (45) Date of Patent: Nov. 29, 2005

(54) COMPUTER-ASSISTED PULL FLOW PRODUCTION MANAGEMENT METHOD

(75) Inventor: Jean-Pierre Levionnois, Luxembourg (LU)

(73) Assignee: Calvasoft B.V., (NL)

( * ) Notice: Subject to any disclaimer, the term of this patent is extended or adjusted under 35 U.S.C. 154(b) by 0 days.

(21) Appl. No.: 10/786,668

(22) Filed: Feb. 25, 2004

(65) Prior Publication Data

US 2004/0186606 A1    Sep. 23, 2004

Related U.S. Application Data

(63) Continuation of application No. PCT/FR02/02953, filed on Aug. 28, 2002.

(30) Foreign Application Priority Data

Aug. 28, 2001  (FR) .................................. 01 11181

(51) Int. Cl.[7] ............................................. G06F 19/00
(52) U.S. Cl. ....................................... 700/99; 700/100
(58) Field of Search ................................... 700/99, 100

(56) References Cited

U.S. PATENT DOCUMENTS

| | | | |
|---|---|---|---|
| 4,827,423 A | | 5/1989 | Beasley et al. |
| 5,150,288 A | | 9/1992 | Imai et al. |
| 5,193,065 A | | 3/1993 | Guerindon et al. |
| 5,751,580 A | * | 5/1998 | Chi ............................. 700/101 |
| 5,963,919 A | * | 10/1999 | Brinkley et al. .............. 705/28 |
| 6,090,262 A | * | 7/2000 | Ide et al. ..................... 205/143 |

OTHER PUBLICATIONS

Yoonho Seo et al., *Configuration and operation of a pull-type flexible manufacturing system*, Manufacturing Review, American Society of Mechanical Engineers, New York, US, vol. 4, No. 1, Mar. 1, 1991, pp. 44-52 (XP000204977).

Babita Sen et al., *Automating the Supplier-Manufacturer Interface with an Electronic KANBAN*, International Journal of Systems Automation: Research & Applications, 1992, USA, vol. 2, No. 3, pp. 305-315 (XP008011685).

A. Ansari, PhD. et al., *Wireless Kanban*, Production and Inventory Management Journal—First Quarter, 1995, American Production & Inventory Control Soc., USA, vol. 36, No. 1, pp. 60-64 (XP008011675).

(Continued)

*Primary Examiner*—Leo Picard
*Assistant Examiner*—Carlos Ortiz Rodriguez
(74) *Attorney, Agent, or Firm*—DLA Piper Rudnick Gray Cary US LLP

(57)   ABSTRACT

A method for computer-aided pulled-flow production management including constructing a nomenclature as a numerical table including information relative to links between a finished product and components composing the finished product, constructing a numerical table pertaining to parameters of each of the components, and determining the number of product requirements including constructing a numerical table of calendar requirements over a period of time, wherein each component for the components whose descriptor has a kanban step is associated with a numerical table including counter descriptors counter $C0$ in which is recorded a state of a number of kanban in circulation with a preceding calculation of requirements, counter $C1$ in which is recorded a state of a total number of kanban after a last calculation of the requirements, counter $C2$ in which is recorded a state of a number of kanban available in stock, pending counter $C3$ in which is recorded a state of a number of pending kanban and not transmitted to counter $C4$, and counter $C4$ in which is recorded a state of a number of kanban in the process of manufacture or in the process of ordering.

16 Claims, 4 Drawing Sheets

OTHER PUBLICATIONS

T.E. Vollman et al., *Manufacturing Planning and Control Systems*, Chapter 7, "Just-in-time", pp. 240-289, 1988, Irwin, Homewood, Illinois (XP002225612).

Orthogon GmbH: "IKS—Integrated Kanban System, Introduction (Version 2.2)", Apr. 9, 2001, pp. 1-55 (XP002202220).

* cited by examiner

COMPUTER-ASSISTED PULL FLOW PRODUCTION MANAGEMENT METHOD

RELATED APPLICATION

This is a continuation of International Application No. PCT/FR02/02953, with an international filing date of Aug. 28, 2002 (WO 03/019435, published Mar. 6, 2003), which is based on French Patent Application No. 01/11181, filed Aug. 28, 2001.

FIELD OF THE INVENTION

This invention relates to computer-aided production management (CAPM). This invention more particularly relates to a CAPM method and system for pulled-flow production management.

BACKGROUND

U.S. Pat. No. 5,193,065 is known in the state of the art. This patent describes a system for ordering and distributing materials in a manufacturing environment. A manufacturing station stores and uses the material and produces a first signal of material shortage in response to consumption of a predetermined quantity of material normally found at a manufacturing station. An intelligent stocking unit stocks the material. A computer system receives the first material shortage signal and responds by searching the storage unit, producing a material-transfer command signal corresponding to the presence of material in the stocking unit and producing a shipment triggering signal corresponding to the absence of material in the stocking unit. A microcomputer generates a program for the material. A logical device receives the shipment-triggering signal and generates a shortage signal in reaction to the shipment-triggering signal and the program for the material. This method of pulled-flow production management solely takes into account information transmitted from downstream to upstream.

Also known in the state of the art is the kanban method described, for example, in Orthogon GmbH "IKS-Integrated Kanban System, Introduction (version 2.2)". The fundamental principles of kanban (or pulled-flow operating on stocks) are: taking into account consumption by reconstitution of the real consumption; and anticipation of short-term requirements by calculation of the average daily consumption (ADC). Kanban is thus a signal (label) which informs a supplier that it must manufacture again or deliver the quantity really consumed by its client.

The principal drawbacks of this system are: it is a manual system incapable of monitoring the number of labels in circulation and of signaling possible losses of labels; it is a rigid system because the number of labels is not recalculated as a function of real and instantaneous demand; transmission of orders to the supplier is not automated and, therefore, not guaranteed; and in the case of use in internal flows (internal clients and suppliers), the emission of the resupplying order does not modify the calculation of the work charges. A great risk is that this reconstitution of consumption which does not take into account the fluctuation of future demand can generate stocks that no longer correspond to the demand.

SUMMARY OF THE INVENTION

This invention relates to a method for computer-aided pulled-flow production management including constructing a nomenclature as a numerical table including information relative to links between a finished product and components composing the finished product, constructing a numerical table pertaining to parameters of each of the components, and determining the number of product requirements including constructing a numerical table of calendar requirements over a period of time, wherein each component for the components whose descriptor has a kanban step is associated with a numerical table including counter descriptors: counter C0 in which is recorded a state of a number of kanban in circulation with a preceding calculation of requirements, counter C1 in which is recorded a state of a total number of kanban after a last calculation of the requirements, counter C2 in which is recorded a state of a number of kanban available in stock, pending counter C3 in which is recorded a state of a number of pending kanban and not transmitted to counter C4, and counter C4 in which is recorded a state of a number of kanban in the process of manufacture or in the process of ordering.

DETAILED DESCRIPTION

This invention makes it possible to advance from manual pulled flow to computer-based pulled flow and thereby resolve the above disadvantages. This invention also resolves the disadvantages of the prior art by proposing to retain the MRP2 pushed flows concept and adding to it the possibility of the pulled flows concept of FIG. 2.

The production management method according to aspects of the invention is intended to organize exchanges of information among different manufacturing, purchasing and distribution processes involving the actors, means and contributors of a global logistical chain (supply chain) as well as piloting transfers and material transformation steps. The information elements are generally transmitted from downstream to upstream, i.e., they start from the market to be transmitted to the suppliers. The materials originate from the suppliers and undergo successive transformation processes to reach the stage of delivery to the client.

State of the Art of Pushed Flows

Description of Manufacturing Resource Planning (MRP)

Figure 1:
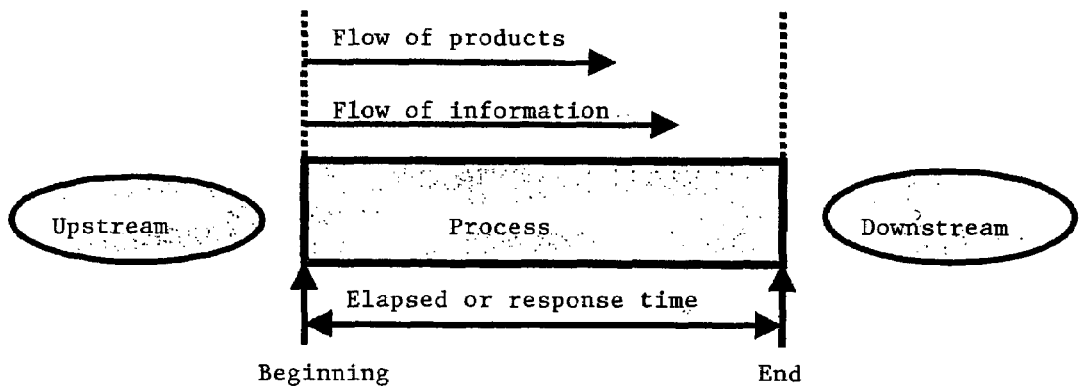
FIG. 1 is a schematic diagram of a computer-aided production management system of the prior art.

A major disadvantage of known methods is the fact that they are constructed on the basis of the sole MRP2 concept (Manufacturing Resource Planning) which is a comparison for each component between:
- the shifted requirements repositioned upstream of the process; and
- the resources which are there in process and the stocks with also a planning of the priorities after analysis of the loaded capacities as shown in FIG. 1. FIG. 1 illustrates the principles implemented in the state of the art.

Each final product sold is broken down into components associated with a nomenclature. By starting with the final product, there is expressed upstream the component needs at each preceding level. There is available for each of the steps an information element expressing the number of finished components (stocks) for each of the intermediary levels, the components in the process of production or transformation. The parts in process of manufacturing and the stocks between two intermediary levels are ignored and not taken into account for calculations of the components available for the downstream level.

The information known at a given level N thus makes it possible to calculate a new information element at the preceding level N−1 as a function: of the description of the components of the composed products of the level N as expressed in the nomenclature; and the constraints associated with the transformation process between N−1 and N, manifested by a predetermined time and recorded in a table. These information elements are propagated in the direction of lower levels. The expression of the net needs (quantity B at a given date J) of final product constitutes the input data that trigger calculations of the net needs at the lower level, in a determinant manner, under the form of a net need at the lower level, expressed in the form of quantities and time intervals.

As an example, when the final product requirement is B on the date J, the net needs at the upstream step are determined by: calculating the difference D between the need B and the quantities of final products existing in stock as well as those in the process of production, i.e., for which the transformation process to advance from step N−1 to step N was triggered; and calculating the date of beginning of manufacture J of the quantity D of finished products as a function of the duration of the process of step N−1 and the security margins to take into account unanticipated events. This result (D, J) constitutes the expression of the needs of the upstream step N−1. It makes it possible to calculate by propagation the needs at each of the intermediary steps up to the initial step of components in accordance with the organization of the nomenclature of the final product.

The Difficulties in Implementing MRP

A disadvantage of this solution is that at each modification of the input data or of an intermediary data element (because of an evolution of a malfunctioning or an unanticipated event), it is necessary to perform a complete new calculation the result of which modifies each of the results (B, J), particularly the launching dates of each of the intermediary steps.

Readjustment of the launching dates creates a permanent fluctuation of the launching dates J which does not take into account the intermediary components positioned between two steps. This disadvantage is aggravated by the fact that the demand updating cycles are shorter than the offers of implementation of the offer and can lead to increasing divergences between the calculated requirements and the real requirements, and between the products offered in application of the calculations and the reality of the instantaneous requirement of the market.

The Solutions Provided by the Invention

Figure 2:
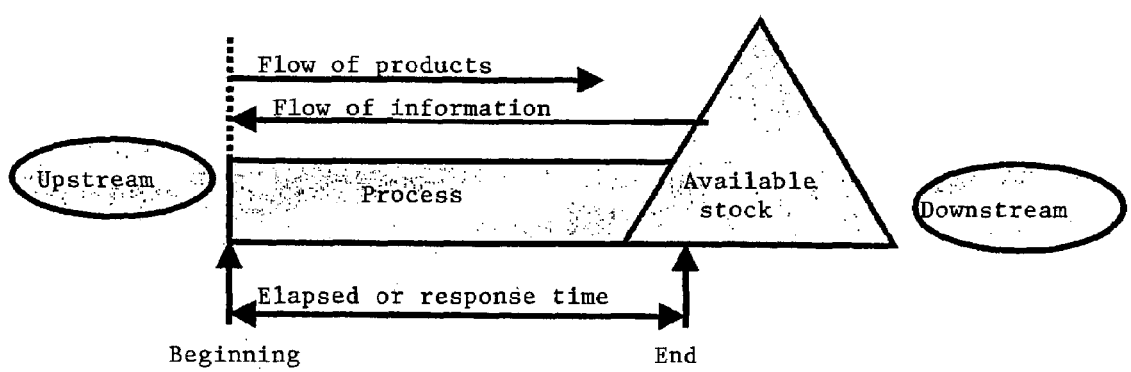
FIG. 2 is a schematic diagram of a computer-aided production management system of the prior art in accordance with aspects of the invention.

The method according to this invention resolves this disadvantage by providing a new solution as illustrated in FIG. 2. The invention takes into account the parts in process of production (intermediary components in process of manufacture between two successive steps) and the stocks existing at each of the steps to calculate the quantities available at each step. This taking into account avoids excessive offsets resulting from lack of knowledge of the parts in process of production found in the prior art.

Fluctuations in the demand are absorbed by the variations of stocks. The invention does not impose the manufacturing date on each of the intermediary steps after each calculation, but imposes the level B of the stock necessary to satisfy demand at each intermediary step. The method leads to:
control of the smoothing of the parts in the processing of manufacturing; and
desynchronization of manufacturing steps because of autonomy in the management of the components and the management principles on monitored and controlled intermediary stocks, generally not zero.

The invention makes it possible to minimize intermediary stocks which constitute buffers of the intermediary steps. It is also possible to take into account external constraints to set an intermediary stock at a higher level than the calculated minimum because of the desynchronization. However, these external constraints are not propagated upstream or downstream. The consignment value of the state of the pending orders can be a negative value to anticipate a slowing down or even suspension of needs upstream.

The method according to aspects of this invention is a set of assistance tools for industrial management making it possible to optimize the choice between a means forecasting logic (MRP type in pushed flows) and a consumption reconstitution mechanic (pulled flows). It is modular. This means that it is possible to integrate supplementary functionalities in an existing CAPM system or method as well as constitute all or part of an autonomous CAPM equipment unit.

For this purpose, the invention pertains in its most general sense to a computer-aided pulled-flow method for production management comprising:
a step of construction of a nomenclature in the form of a numerical table comprising information relative to the links between a given finished product and the components composing the finished product,
a step of construction of a numerical table pertaining to the parameters of each of the components,
a step of determination of the number of product requirements consisting of constructing a numerical table of the calendar requirements over a given period (for example, 12 months), wherein the step of construction of the table of the components comprising a descriptor specifies the management mode (kanban, order threshold, client order, synchronous, MRPII and the like) associated with said component, and
the step of determination of the number of product requirements pertains to the needs in crude products and has a step of the kanban or threshold type, the calculation of an average daily consumption parameter (ADC) by determination of the ratio of the crude requirements to the number of days in the given period.

The step of construction of the table of components advantageously comprises for the components whose descriptors have a kanban or threshold type management mode the definition of a parameter corresponding to the duration of the calculation period of the requirement.

Description of the Product

The method uses counters measuring the state of different parameters and transmitting the information elements to a calculator to calculate the consignments and propose the order, i.e., to automate the different steps of the management chain.

For each finished product (PF), a nomenclature is defined which describes the dependencies or links between the finished product, the semifinished components and the primary components. For each of these components, a table stored in memory describes their parameters. On the basis of these information elements, it is possible to construct a table of calendar requirements.

It is possible to specify for each component which management mode is to be used. This mode can be, for example: a classic management of type MRP2, a synchronous mode for articles entering directly into the assembly of a finished product, a "client order" mode for the finished products or a more evolved mode such as "order threshold" or kanban. In these two latter cases of "order threshold" and kanban, the method according to the invention may include a step of calculation of the Average Daily Consumption (ADC) for determination of the ratio between the gross requirements and the number of days of said given period.

For the components whose descriptor has a kanban type step, each component is associated with a numerical table comprising, for example, descriptors such as:

counter C0 in which is recorded the state of the number of kanban in circulation according to the preceding calculation of the requirements, counter C1 in which is recorded the state of the total number of kanban in circulation after the calculation of the requirements, counter C2 in which is recorded the state of the number of kanban available in stock, pending counter C3 in which is recorded the state of the number of kanban which are pending and have not been transmitted to the counter C4, counter C4 in which is recorded the state of the number of kanban in the process of manufacturing or in the process of ordering.

These counters are materialized by physical or electronic counters such as memory registers, electronic circuits, analogue, digital indicators or the like.

The state of the pending counter C3 is ideally determined by the difference between the counters C0 and C1. The consumption reconstitution loop is inhibited when the value of the pending counter C3 is negative. The state of the pending counter C3 is ideally determined by the difference between the counters C0 and C1. The consumption reconstitution loop is activated when the value of the pending counter C3 is positive and the size of the lot is reached.

For components having an order threshold step there is ideally associated an order threshold value, a stock value and an in process of manufacturing or order value. This value is inhibited when the order threshold is lower than the source of the stock and of the order in process or manufacturing in process.

According to a particular mode of implementation, each component is associated—for the components whose descriptors present a kanban step—with a numerical table comprising the following descriptors of the counters:

counter C0 in which is recorded the state of the number of kanban in circulation with the preceding calculation of the requirements, counter C1 in which is recorded the state of the total number of kanban after the last calculation of the requirements, counter C2 in which is recorded the state of the number of kanban available in stock, pending counter C3 in which is recorded the state of the number of kanban that are pending and not transmitted to counter C4, counter C4 in which is recorded the state of the number of kanban in the process of manufacturing or in the process of ordering.

The state of the pending counter C3 is preferably determined by the difference between the counters C0 and C1. The consumption reconstitution loop is inhibited when the value of the pending counter C3 is negative.

According to a variant, the state of the pending counter C3 is determined by the difference between the counters C0 and C1, and in that the consumption reconstitution loop is activated when the value of the pending counter C3 is positive and the size of the lot is reached (1 kanban or n kanban, when a lot is constituted by multiple kanban). According to a particular mode of implementation, the method comprises steps of introduction of parameters relative to external constraints to modify the state of the pending counter C3. According to a variant, the method comprises imposing a value D on the counter C3 corresponds to the largest of the values between the value calculated by minimization of the pending stock and the value of the external constraint. According to a particular variant, the value C3 can be a negative value.

EXAMPLE

Better comprehension of the invention will be obtained from the description below which refers to a nonlimitative example of implementation.

Figure 3:
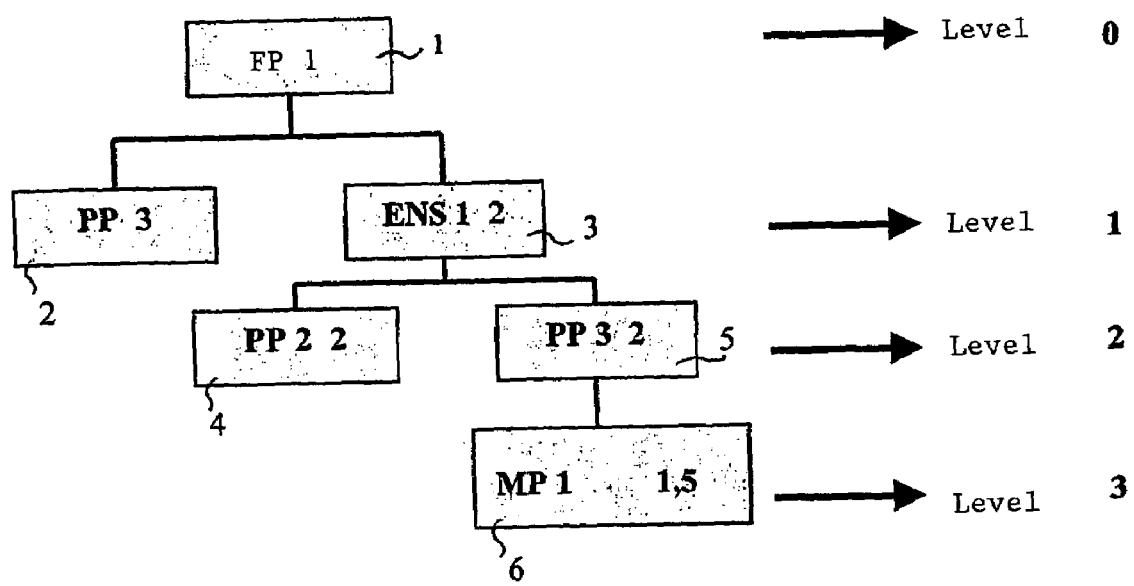
FIG. 3 is a schematic diagram of an organizational chart of a finished product.

The use of a system according to the invention comprises a first step of construction of nomenclature in the form of a numerical table comprising information relative to links between a given final product and components making up the finished product. FIG. 3 represents the organizational chart of a finished product FP 1 (1). It is composed of two ENS1 components (3) and three PP components (2) corresponding to the products produced at the upstream level (level 1). The ENS component (3) is itself composed of two PP2 components (4) and of two PP3 components (5). These two types of components (4, 5) are produced at the following upstream level (level 2). The component PP3 (5) is composed of 1.5 components MP1 (6) from the following level (level 3). In summary, the finished product FP is composed of five components PP, ENS1, PP2, PP3, MP1 produced at 3 different levels.

Figure 4:
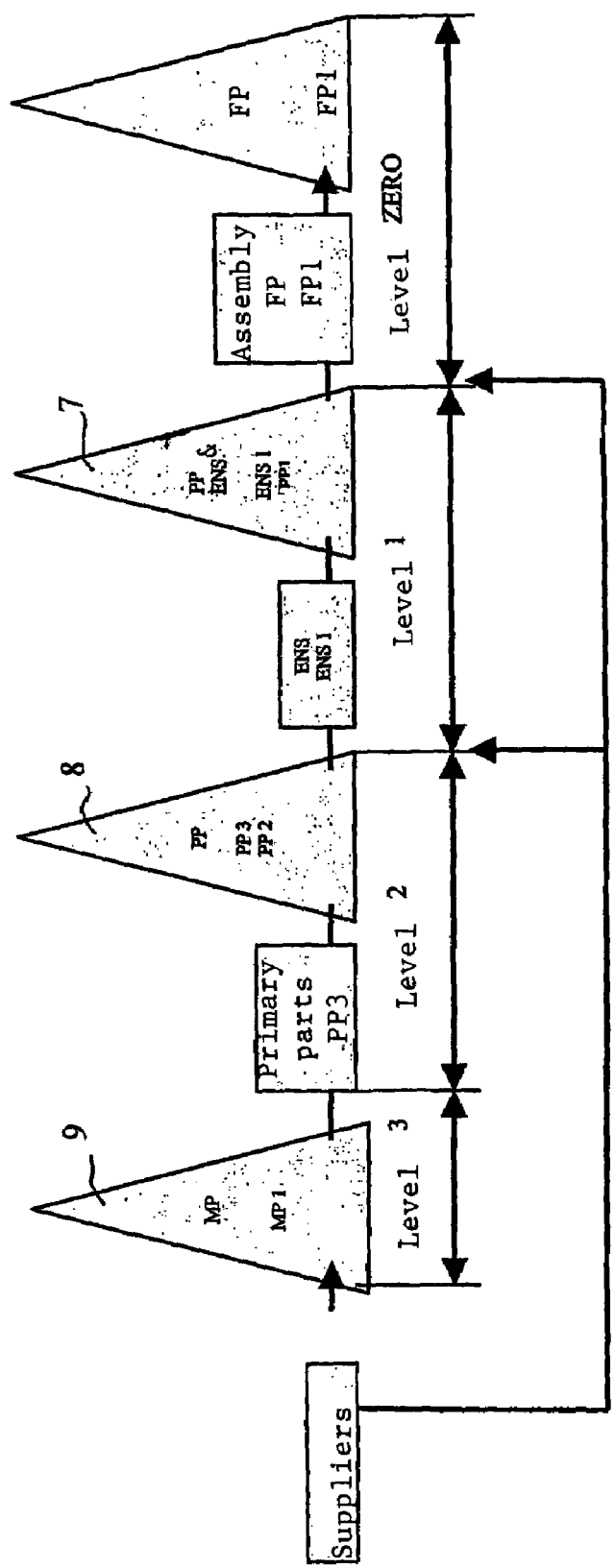
FIG. 4 is a schematic diagram of a stock desynchronization system in accordance with aspects of the invention.

One associates at each nomenclature level a stock desynchronization as represented schematically in FIG. 4. Desynchronization stocks (7 to 9) are provided at each level. The management parameters of the components are associated with each component in the form of a numerical table. According to the "principle of component management autonomy", the different components can have parameters that are:

common and identical, and specific.

The content of the table is constituted by parameters such as: reference, designation, flow type, management unit, piloting mode, piloting mode date, declaration mode, label flag, traceability flag, peak time unit, gross requirement time unit, ADC horizon, ADC horizon offset, actual KB, preceding KB, achieved KB, creation date, user, creation, modification date, user modification, lot, security. To each component corresponds one and only one piloting mode. Table 1 is an example of piloting modes of each of the components of PF1 nomenclature.

The next step advances to the determination of the number of product requirements (calendar requirements over a period of 12 sliding months). The requirements are:

firm requirements issued by the client orders, and provisional requirements stemming from the analyses of potential sales.

This requirement is expressed in the form of a table indicating for each of the future periods the quantities of finished products FP required. This calendar breakdown can be expressed in weeks or in days, notably in the first months of expression, i.e., M. M+1.

On the basis of this information which can be updated on a regular basis, the next step is determination of the gross requirements GR for each component constituting the final production in application of the nomenclature. In the facts, the components FP 1 can have links with a multiplicity of finished products FP. The system cumulates the requirements for the common components of the set of nomenclatures of the FP.

Another step includes periodically advancing to calculation of the average daily consumption (ADC) for the components from a system point of view for the components with kanban and order threshold piloting mode. This variable takes into account the monthly gross requirements calculated by the system and a period expressed in number of days to calculate an average on the gross requirements during the period under consideration. The counters take into account intrinsic data and consignment values relative to the requirements in finished products and components. The counters can also in certain applications take into account the external parameters relative to the availability of components, notably components of the most upstream level. In this case, the counter C3 receives a value corresponding to the largest of the values between the value calculated for minimizing the pending stock of the components of the downstream level and the value of the external parameter.

Figure 5:
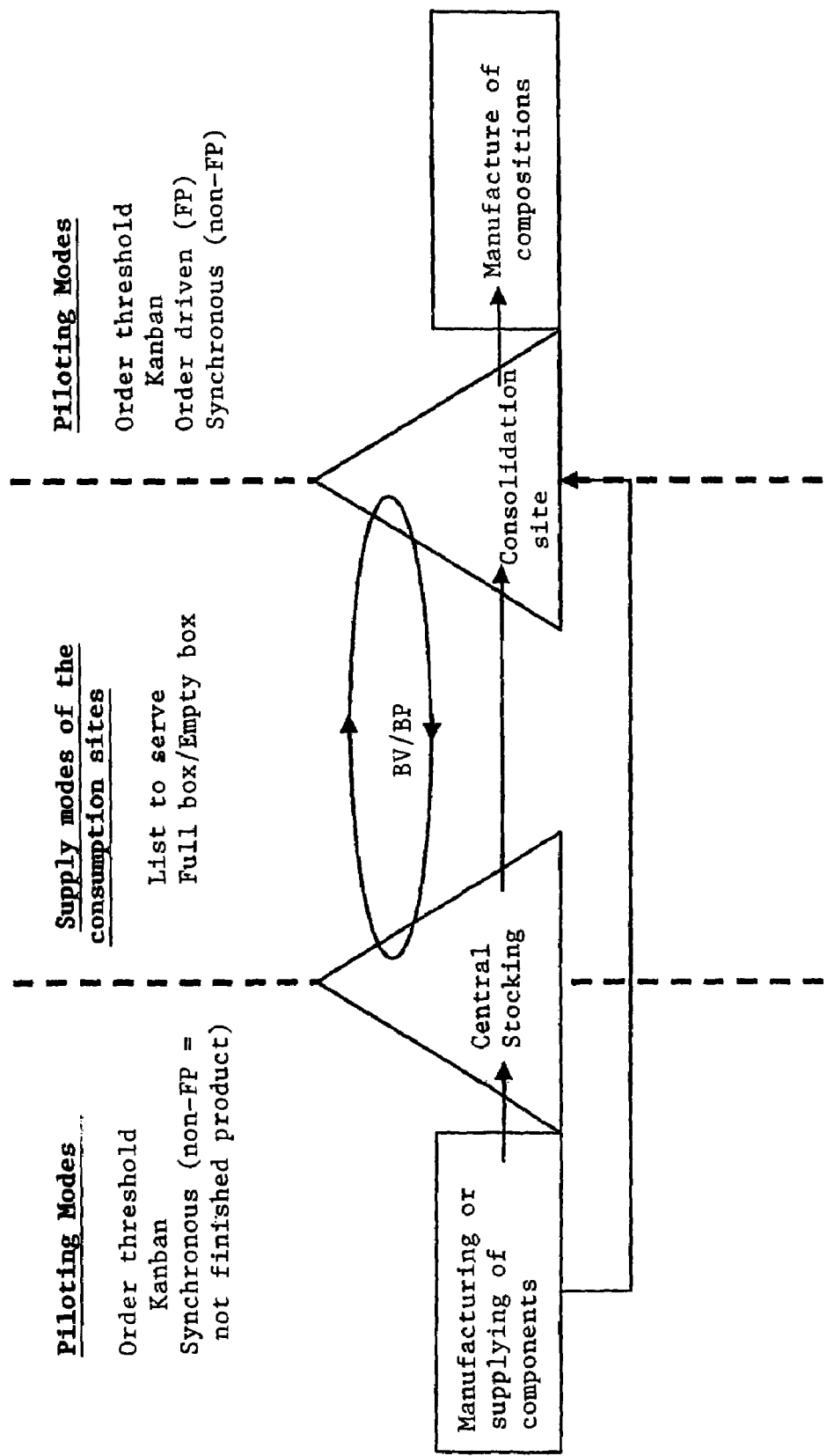
FIG. 5 is a schematic diagram of a preferred embodiment of the invention.

The description below pertains to a particular mode of implementation illustrated by FIG. 5. The method allows a veritable adaptation of supplying consumption sites (work stations for the articles in the process of manufacturing or placement in stores for the finished products) as a function of physical or administrative constraints. Traditionally, in a pushed flows system, supplying the consumption sites is performed by a list to serve a system, i.e., by calculation of a quantity of components to deliver, exploding the nomenclature of the composed product. That method has the disadvantage of not taking into account the reality of the consumption at the station, which can be strongly disturbed by nonconforming components or annexed consumptions. In such a case, the manufacturing or distribution can be interrupted due to a lack of components.

The method advantageously allows selection among two different modes for piloting this supplying:

direct delivery in pulled flows to the station or store position using the kanban option of the method; and reconstitution of the consumption by an empty box/full box system, which is a kanban simplified to two labels.

TABLE 1

| Component Reference | Piloting Mode | Comments |
| --- | --- | --- |
| FP 1 [finished product 1] | Order threshold (stock management) | FP 1 could also be managed by the client order rather than on the stock |
| PP 1 | MRP2 | |
| ENS 1 | synchronous | |
| PP 2 | kanban | |

TABLE 1-continued

| Component Reference | Piloting Mode | Comments |
| --- | --- | --- |
| PP 3 | kanban | |
| MP 1 | threshold order | |

What is claimed is:

1. A method for computer-aided pulled-flow production management comprising:

constructing a nomenclature as a numerical table comprising information relative to links between a finished product and components composing the finished product, constructing a numerical table pertaining to parameters of each of the components, and determining the number of product requirements comprising constructing a numerical table of calendar requirements over a period of time, wherein each component for the components whose descriptor has a kanban step is associated with a numerical table comprising counter descriptors:

counter C0 in which is recorded a state of a number of kanban in circulation with a preceding calculation of requirements, counter C1 in which is recorded a state of a total number of kanban after a last calculation of the requirements, counter C2 in which is recorded a state of a number of kanban available in stock, pending counter C3 in which is recorded a state of a number of pending kanban and not transmitted to counter C4, and counter C4 in which is recorded a state of a number of kanban in the process of manufacture or in the process of ordering.

2. The method according to claim 1, wherein constructing the table of the components comprising a description specifies the management mode associated with the component, and determining the number of product requirements pertaining to requirements of raw products and, for components whose descriptor has a kanban or threshold step, calculating a parameter of average daily consumption (ADC) by determination of a ratio of gross requirements over number of days of the given period.

3. The method according to claim 1, wherein construction of the components comprises, for components whose descriptor has a kanban or threshold step, an additional definition of a parameter corresponding to duration of the demand calculation period.

4. The method according to claim 1, wherein the state of the pending counter C3 is determined by a difference between the counters C0 and C1, and a consumption reconstitution loop is inhibited when a value of the pending counter C3 is negative.

5. The method according to claim 1, wherein the state of the pending counter C3 is determined by a difference between the counters C0 and C1, and a consumption reconstitution loop is activated when a value of the pending counter C3 is positive and the size of the lot is reached.

6. The method according to claim 1, further comprising introducing parameters relative to external constraints for modification of the state of the pending counter C3.

7. The method according to claim 6, further comprising imposing a value D on the counter C3 corresponding to the largest of values between a value calculated for minimizing the pending stock and a value of the external constraint.

8. The method according to claim 1, wherein the value C3 can be a negative value.

9. The method according to claim 2, wherein the step of construction of the components comprises, for components whose descriptor has a kanban or threshold step, an additional definition of a parameter corresponding to duration of the demand calculation period.

10. The method according to claim 2, wherein the state of the pending counter C3 is determined by a difference between the counters C0 and C1, and a consumption reconstitution loop is activated when a value of the pending counter C3 is positive and the size of the lot is reached.

11. The method according to claim 3, wherein the state of the pending counter C3 is determined by a difference between the counters C0 and C1, and a consumption reconstitution loop is activated when a value of the pending counter C3 is positive and the size of the lot is reached.

12. The method according to claim 4, wherein the state of the pending counter C3 is determined by a difference between the counters C0 and C1, and the consumption reconstitution loop is activated when a value of the pending counter C3 is positive and the size of the lot is reached.

13. The method according to claim 2, further comprising introducing parameters relative to external constraints for modification of the state of the pending counter C3.

14. The method according to claim 3, further comprising introducing parameters relative to external constraints for modification of the state of the pending counter C3.

15. The method according to claim 4, further comprising introducing parameters relative to external constraints for modification of the state of the pending counter C3.

16. The method according to claim 5, further comprising introducing parameters relative to external constraints for modification of the state of the pending counter C3.

* * * * *